United States Patent
Fischer et al.

(10) Patent No.: US 9,461,883 B2
(45) Date of Patent: Oct. 4, 2016

(54) COUPLING DEVICE FOR A DATA TRANSMISSION NETWORK AND DATA TRANSMISSION NETWORK

(71) Applicant: Airbus Operations GmbH, Hamburg (DE)

(72) Inventors: Wolfgang Fischer, Hamburg (DE); Peter Klose, Hamburg (DE); Volker Ziegler, Neubiberg (DE)

(73) Assignee: Airbus Operations GmbH, Hamburg (DE)

( * ) Notice: Subject to any disclaimer, the term of this patent is extended or adjusted under 35 U.S.C. 154(b) by 102 days.

(21) Appl. No.: 14/569,267

(22) Filed: Dec. 12, 2014

(65) Prior Publication Data

US 2015/0172116 A1    Jun. 18, 2015

Related U.S. Application Data

(63) Continuation of application No. PCT/EP2013/062454, filed on Jun. 15, 2013.

(60) Provisional application No. 61/660,289, filed on Jun. 15, 2012.

(30) Foreign Application Priority Data

Jun. 15, 2012   (DE) .................. 10 2012 210 161

(51) Int. Cl.
*H04L 12/24*    (2006.01)
*G06F 11/20*    (2006.01)
(Continued)

(52) U.S. Cl.
CPC ....... *H04L 41/0806* (2013.01); *G06F 11/1633* (2013.01); *G06F 11/1654* (2013.01);
(Continued)

(58) Field of Classification Search
CPC ........... G06F 11/1633; G06F 11/1654; G06F 11/2033; G06F 11/2038; G06F 11/2097; H04L 41/0806; H04L 49/557

USPC .......................................................... 370/384
See application file for complete search history.

(56) References Cited

U.S. PATENT DOCUMENTS 8,074,098 B2 * 12/2011 Fukuyama .......... G06F 11/2025
                                                           714/11
8,307,239 B1 * 11/2012 Keith, Jr. ............ G06F 11/1456
                                                           714/2

(Continued)

FOREIGN PATENT DOCUMENTS

EP            2204706 A1      7/2010

OTHER PUBLICATIONS

German Search Report for Application No. 10 2012/210,161.6 dated Aug. 2, 2013.

(Continued)

*Primary Examiner* — Chi H Pham
*Assistant Examiner* — Robert Lopata
(74) *Attorney, Agent, or Firm* — Jenkins, Wilson, Taylor & Hunt, P.A.

(57) ABSTRACT

A coupling device for connection of one of two servers at a time to a data transmission network as well as to a data transmission network having a coupling device. The device has a first and second terminal for connecting a first and second server and a third terminal for connection to the data transmission network. A switch device is provided having a first switching state where the third terminal is connected to the first terminal and disconnected from the second terminal, and a second switching state, where the third terminal is connected to the second terminal and disconnected from the first terminal. The switch device is adapted to assume a switching state, when it is provided with the energy signal by the power supply, and to assume another switching state, when it is not provided with the energy signal by the power supply.

10 Claims, 2 Drawing Sheets

(51) Int. Cl.
    *G06F 11/16* (2006.01)
    *H04L 12/939* (2013.01)
(52) U.S. Cl.
    CPC ....... *G06F11/2033* (2013.01); *G06F 11/2038* (2013.01); *H04L 49/557* (2013.01); *G06F 11/2097* (2013.01)

(56) References Cited

U.S. PATENT DOCUMENTS

| | | | |
|---|---|---|---|
| 2003/0172093 A1* | 9/2003 | Nagoya | G06F 11/2025 |
| 2006/0077891 A1 | 4/2006 | Smith et al. | |
| 2006/0268684 A1 | 11/2006 | Cohn | |
| 2006/0271813 A1* | 11/2006 | Horton | G06F 11/2028 |
| | | | 714/4.11 |
| 2006/0290208 A1 | 12/2006 | Chang et al. | |
| 2008/0091746 A1* | 4/2008 | Hatasaki | G06F 11/2033 |
| 2008/0148098 A1* | 6/2008 | Chen | G06F 11/2028 |
| | | | 714/13 |
| 2008/0184059 A1* | 7/2008 | Chen | G06F 11/2025 |
| | | | 714/4.1 |
| 2009/0248755 A1* | 10/2009 | Watanabe | G06F 1/3209 |
| 2009/0271654 A1* | 10/2009 | Fukuyama | G06F 11/2025 |
| | | | 714/4.1 |
| 2010/0042715 A1* | 2/2010 | Tham | G06F 11/2025 |
| | | | 709/224 |
| 2012/0023340 A1 | 1/2012 | Cheung | |
| 2012/0151248 A1* | 6/2012 | Bower, III | G06F 1/30 |
| | | | 714/4.11 |
| 2014/0095925 A1* | 4/2014 | Wilson | G06F 11/1425 |
| | | | 714/4.12 |
| 2015/0006948 A1* | 1/2015 | Yamabiraki | H04L 67/1034 |
| | | | 714/4.11 |

OTHER PUBLICATIONS

Written Opinion for Application No. PCT/EP 2013/062454 dated Jun. 15, 2013.
International Search Report for Application No. PCT/EP 2013/062454 dated Nov. 7, 2013.
International Search Report and Written Opinion for Application No. PCT/EP 2013/062454 dated Dec. 16, 2014.
European Office Action for Application No. 13 732 857.1 dated Feb. 16, 2016.

* cited by examiner

COUPLING DEVICE FOR A DATA TRANSMISSION NETWORK AND DATA TRANSMISSION NETWORK

CROSS-REFERENCE TO RELATED APPLICATION

This application is a continuation of and claims priority to PCT/EP2013/062454 filed Jun. 15, 2013, which claims priority to German Patent Application No. 10 2012 210 161.6 filed Jun. 15, 2012, and U.S. Provisional Application Ser. No. 61/660,289 filed Jun. 15, 2012, the entire disclosures of which are incorporated by reference herein.

TECHNICAL FIELD

The disclosure herein relates to a coupling device for connecting one of two servers at a time to a data transmission network, and to a corresponding data transmission network which comprises such a coupling device, to which two servers are connected.

BACKGROUND

In many applications in which use is made of data transmission networks there is the desire or even the necessity to ensure a fault tolerance which is as high as possible. For this purpose, habitually parts of the networks, i.e. at least the essential network components, are constructed redundantly or even the entire network is constructed redundantly. For example, if a data transmission network comprises a server providing data to other network devices or entities, one or more further identical or essentially identical servers can be provided which, in the case of a failure of the former server, can take over its tasks.

One example for data transmission networks, in which servers are used and in which a high fault tolerance is absolutely required, are automation or communication systems of vehicles, such as, e.g., aircraft. These data transmission networks are often configured as Ethernet networks, which may have, amongst others, a star-type configuration.

One example for an Ethernet based data transmission network in aircraft is the cabin management system of aircraft of the types Airbus A380 and A350. In these aircraft the Ethernet standard 10baseT having a data rate of 10 Mbps is employed, and two or three redundant servers are provided, one or two of which serve as failover for the server operating during normal operation. Due to the relatively low data rate it is possible to couple the servers into the network by a passive coupling device in the form of a simple T-connector.

However, in case higher data rates are to be used, such as, for example, a data rate of 100 Mbps according to the Ethernet standard 100baseT, the coupling by T-connectors is no longer suitable. Instead, as a rule an active coupling device, such as a network switch, is used in order to functionally couple the servers to or into the data transmission network. Due to their active construction, as compared to simple and passive T-connectors such coupling devices are, however, much more prone to errors, so that the fault tolerance of the network as a whole is significantly reduced by their use. Generally, similar considerations also apply for differently configured Ethernet data transmission networks and for data transmission networks not operating in accordance with the Ethernet standard.

Due to this fact data transmission networks, such as, for example, data transmission networks which are utilized in aircraft as, e.g., part of the cabin management system, are often constructed or configured redundantly in their entirety. In other words, several separate physical networks are provided, and the data transmission is taking place in parallel in all networks. In general and in particular in aircraft it is desirable to keep the hardware expenditure and the complexity of the system as low as possible and to nevertheless ensure a high fault tolerance.

SUMMARY

It is an object of the disclosure herein to construct or configure a coupling device and a data transmission network in such a manner that several redundant servers can be coupled into a data transmission network having a high data rate and at the same time a high fault tolerance is ensured with a relatively low hardware expenditure, and that the mentioned disadvantages are overcome.

The features of the subject matter herein serve to achieve this object. Advantageous embodiments of the coupling device and of the data transmission network are disclosed herein.

According to the disclosure herein, first of all a coupling device is provided which is configured for connecting one of two or also more servers at a time (i.e. in each case one of two or also more servers) to a data transmission network, which may be, for example, an Ethernet network and in particular an Ethernet network having a star-type configuration. The coupling device comprises a first terminal or port for connecting a first server, a second terminal or port for connecting a second server, and a third terminal or port for connecting to a data transmission network. In this regard, the mentioned terminals preferably each comprise at least one separate connecting socket or one separate connecting plug, to which a suitable cable for connecting to the servers and the data transmission network, respectively, can be connected. In case the coupling device is intended for use with an Ethernet data transmission network, the terminals may, for example, each comprise an Ethernet socket or an Ethernet plug. As will be explained in detail further below, the connection to the data transmission network can be effected either directly or also via one or more network components, which are, for example, connected in series to the third terminal of the coupling device. Such network components may also block the data communication path for the first and second servers to downstream other network devices or entities, so that the connection to the data transmission network by the third terminal only means that the two servers have the possibility to communicate with other network devices or entities through the coupling device.

Further, the coupling device comprises a switch device which has and can assume a first switching state and a second switching state. In the first switching state the third terminal is electrically connected to the first terminal and electrically disconnected from the second terminal, so that a first server connected to the first terminal is able to communicate via a data transmission network connected to the third terminal and a second server connected to the second terminal cannot communicate via the data transmission network. In the second switching state the third terminal is electrically connected to the second terminal and electrically disconnected from the first terminal, so that a second server connected to the second terminal is able to communicate via a data transmission network connected to the third terminal and a first server connected to the first terminal cannot communicate via the data transmission network. In other words, by a change between the two switching states it is possible to selectively couple exactly one of two servers connected to the first and second terminals to the data transmission network. In other words, in the manner described it is possible to connect or couple the two servers to or into the data transmission network by the coupling device, wherein, however, depending on the switching state only one of the two servers is or can be communicatively connected to the data transmission network.

Finally, the coupling device comprises a power or energy supply which is electrically connected to the switch device and configured for supplying the switch device with energy. This power supply is either connected to a first server connected to the first terminal or a second server connected to the second terminal or can be connected to the respective server. It is adapted to then receive energy from the respective server—at least as long it is active and ready to operate—and to provide an energy signal to the switch device. The latter receives the energy signal preferably at a control input of the switch device. As will be explained in detail below, the power supply may be constructed or configured such that it generates the energy signal in a form suitable for the switch device from the energy received from the respective server, or that it passes on the energy received from the respective server unchanged or essentially unchanged as energy signal to the switch device. In the latter case it may be necessary that the respective server is adapted such that it already supplies the energy signal suitable for the switch device to the coupling device. Then, the power supply is essentially formed or constituted by an internal lead or line of the coupling device, by which lead or line the energy signal is delivered to the switch device.

The switch device is adapted to assume one of the first and second switching states when it is supplied with the energy signal by the power supply, and to assume the other of the first and second switching states when it is not supplied with the energy signal by the power supply. In other words, the switch device is constructed in such a manner that without power supply or without suitable power supply it assumes a defined switching state by itself and automatically.

Thus, the energy signal is a signal which is provided to the switch device and ensures that the switch device assumes a defined one of its two switching states. By contrast, if this energy signal is not provided, which includes that a different signal not suitable for the mentioned purpose is provided, the switch device assumes its other switching state. In this regard, the energy signal can be a predetermined signal or a signal having parameters being within predetermined bounds or thresholds. Thus, preferably the energy signal is in particular a signal which supplies a predetermined energy or a predetermined minimum energy to the switch device sufficient for switching into the defined switching state. If the minimum energy is no longer present or if the supplied energy falls below a predetermined limit or threshold, this switching state can no longer be maintained, and the switch device changes into the other switching state. The energy signal may preferably simply be a—for example constant—voltage having a predetermined voltage value or at least one predetermined voltage value. Then, any voltage below the predetermined voltage value or—in order to take into account tolerances—in particular a voltage below a predetermined limit or threshold and the voltage zero do not correspond to the energy signal. Similarly, the energy signal may also simply be a—for example constant—current. However, it is also conceivable that the energy signal is alternatively or additionally defined by a particular signal shape in time and that, accordingly, a signal having a deviating signal shape does not constitute the energy signal.

Before this background the energy signal can also be referred to as driving or control signal or switching signal for the switch device, wherein this driving or control signal or switching signal is adapted and suitable to switch the switch device into the respective one of the first and second switching states and to maintain it therein.

Therefore, it is advantageously possible to connect two servers to the first and second terminals of the coupling device and to operate them in such a manner that in a normal mode of operation only one of the two servers is active or operates and is communicatively connected to the data transmission network by the switch device, and that—for example in case of a failure of this server—a change to the other server is automatically taking place. The fault tolerance is maintained at a high level, because the faulty server does not have to participate in the switching of the switch device anymore. For this reason, it is particularly preferred that the second switching state is the one that is assumed by the switch device without the energy signal. Due to the fact that at any time only one of the servers is connected to the network by the coupling device, it is possible to realize at the same time a high data rate, and due to the fact that the coupling device does not have or does not need to have an own, independent power supply, no significant additional sources of errors are introduced due to its use. Also, in this manner the advantages of savings with respect to weight, costs and space requirements—important in particular for, e.g., aircraft—arise.

It is also possible that the coupling device is integrated into a server, which is then the first or second server. Then, the other server is connected to or interfaced with the coupling device integrated into the other server. In this case it is further preferred if a coupling device according to the disclosure herein is integrated into both servers, in order that the servers are identically constructed with respect to hardware.

In a preferred embodiment the power supply comprises an energy signal generation circuit. This circuit is connected to the first terminal in such a manner that in operation it receives a portion of the signal energy of the data signals which are transmitted by a first server connected to the first terminal. For this purpose it may be provided, for example, in a line or lead branching off the line or lead extending between the first terminal and a switch contact of the switch device and serving to transmit data signals between the server and the data transmission network. The energy signal generation circuit is adapted to generate the energy signal, which is supplied to the switch device, from the received portion of the signal energy.

In this embodiment the lack of a data signal at the first terminal results in the energy signal generation circuit not generating an energy signal, so that the energy signal is not supplied to the switch device and the switch device changes to or remains in its switching state corresponding to the lack of the energy signal. In this regard, it is particularly advantageous if the second switching state is the one which is assumed by the switch device upon lack of the energy signal. Thus, as will be explained later, the first server must always at least transmit null or padding data in its active or operational state, in order to prevent a change to the second server.

In an alternative, related preferred embodiment the energy signal generation circuit is not connected to the first terminal, but to the second terminal, and this in such a manner that in operation it receives the data signals which are transmitted by a second server connected to the second terminal. Apart from that this embodiment corresponds to the preceding embodiment.

Thus, in this embodiment the lack of a data signal at the second terminal results in the energy signal generation circuit not generating an energy signal, so that the energy signal is not supplied to the switch device and the switch device changes to or remains in its switching state corresponding to the lack of an energy signal. In this regard, it is particularly advantageous if the second switching state is the one which is assumed by the switch device upon presence of the energy signal. Apart from that, equivalent explanations to the preceding embodiment apply.

In a further alternative preferred embodiment the power supply comprises a power supply terminal for connection to a power supply cable, which extends from either a first server connected to the first terminal or a second server connected to the second terminal. In this regard, the power supply terminal is preferably configured as a separate terminal or port with respect to the first terminal and the second terminal. However, it is also possible that it is combined in a single terminal or port with the first terminal and the second terminal, respectively. In the latter case the power supply cable is formed or constituted by the cable by which the first server and the second server, respectively, is connected to the first terminal and the second terminal, respectively, wherein the power may also be transmitted directly via the network line, if desired (in the case of an Ethernet network for example by Power over Ethernet), so that the power supply terminal is then identical to the first terminal and the second terminal, respectively. Otherwise the power supply cable is a separate cable which, on the other side, is connected to a corresponding output of the respective server at which energy for the power supply of the coupling device is provided.

In this embodiment the power supply further comprises a power supply line, lead, wire or cable provided in the interior of the coupling device and interconnecting the power supply terminal and the switch device. In this regard, it is in particular advantageous if the power supply is adapted to cooperate with a server which already provides the energy signal suitable for the switch device of the coupling device at its output to be connected to the power supply cable. This energy signal is then merely passed on unchanged to the switch device via the power supply line. Therefore, the power supply can be constructed particularly simple and may, for example, essentially merely comprise the power supply terminal and the power supply line. However, it is also possible that the power supply is adapted to cooperate with a server which, at its output to be connected to the power supply cable, does not yet provide an energy signal which is suitable for controlling or driving the switch device. Then, the power supply further comprises a circuit which generates the suitable energy signal from the output provided by the respective server at the power supply terminal. Such a circuit may be provided in the power supply line or between two sections of the power supply line.

In any case, the switch device comprises one or more switch components. Some or all of these are preferably constructed or configured as normally-OFF or normally-ON components—depending on whether the first or the second switching state is the one which is assumed upon lack of the energy signal. For example, FETs of the enrichment type, MEMS switches, relays or REED relays may be used as normally-OFF components and, for example, FETs of the depletion type, relays or REED relays may be used as normally-ON components. In order to minimize additional sources of error it is in particular advantageous if the switch components are constructed as purely electronic and not as electromechanical switches.

The described coupling device according to the disclosure herein can be used in an advantageous manner as part of a data transmission network, which may be, for example, an Ethernet network and in particular a star-type Ethernet network. Such an Ethernet network may be configured in accordance with the Ethernet standard 100baseT or a standard having a higher data rate. Generally, the data transmission network can be applied to a vehicle or aircraft and may be, for example, part of an automation or communication system. In aircraft it may be, for example, a part of the cabin management system.

The data transmission network further comprises a first server and a second server, each of which can assume an active state, in which it is able to transmit data, and a passive state, in which it is not able to transmit data. In the simplest case the passive state is the switched off state of the respective server. However, the respective server may also be configured such that in its switched on state it is able to selectively assume an active state and a passive state. Then, the passive state may be, for example, a standby or energy saving state, in which the server, if desired, is still able at least to a certain extent to receive and evaluate or interpret data, in particular data exchanged via the data connection between the two servers described further below.

By its third terminal the coupling device is connected, in the manner explained above, to the data transmission network directly or via one or more further components, and the first server is connected to the first terminal of the coupling device and the second server is connected to the second terminal of the coupling device. As mentioned above, it is also possible in this regard that the coupling device is integrated into the first server or the second server. Then, the connection of the respective server to the coupling device takes place internally within the server and may be, in particular, permanent.

Between the first server and the second server a data connection exists, which is provided separately from the actual data transmission network and may be wired or wireless. It may be realized by separate terminals at the two servers, which terminals are connected by a data line or also several data lines. However, it is also possible, for example, that the data connection on the part of the first server branches off the data output connected to the first terminal of the coupling device. The data connection is configured in such a manner that the second server is able to determine when the first server is in its passive state or fails. In other words, the first server is adapted such that it provides information on the data connection, on the basis of which information the second server is able to determine whether the first server is operational in its active state or whether it is in its passive state or has failed, and the second server is adapted to evaluate the provided information accordingly. This evaluation may take place continuously or at intervals or intermittently.

The first server, the second server and the switch device are adapted and connected such that the switch device assumes the first switching state when the first server is in its active state and operational. This is the normal mode of operation, in which the first server operates and the second server merely functions as failover and is preferably in its passive state. However, in this passive state the second server in operation still evaluates the information provided via the data connection between the two servers. This and the separate data connection overall are required, because the second server needs to actively take action and, e.g., change to its active state upon a failure of the first server.

The switch device and the second server are adapted such that the switch device assumes the second switching state and the second server assumes its active state when the first server, which until then operated normally in its active state, changes to its passive state or fails. This takes place automatically based on what the second server determines on the basis of the information provided on the data connection between the two servers. In particular upon failure of the first server it is also possible in this regard that, as compared to times of an active and operational first server, no information are present or provided any longer on the data connection, and that the lack of such information is interpreted by the second server as an indication that the first server has failed or has changed into its passive state. However, the change to the passive state and also the failure may also be indicated by particular information, if desired.

Such a data transmission network exhibits the advantages indicated above, which are provided by the use of the coupling device.

In a preferred embodiment of the data transmission network the coupling device is configured according to the embodiment described above, in which the power supply comprises an energy signal generation circuit for generating the energy signal from a portion of the signal energy of the data signals received at the first terminal from the first server. The switch device of the coupling device is then adapted to assume the first switching state when it is supplied with the energy signal by the power supply, and to assume the second switching state when it is not supplied with the energy signal by the power supply. In this manner it is ensured that the switch device assumes and remains in the second switching state when the first server changes to its passive state or fails, because then the first server does not transmit data signals and, thus, the energy signal generation circuit does not generate an energy signal and provide it to the switch device. In order that this does not already take place in the active and operational state of the first server, it must further be adapted such that subsequent to its switching on it transmits a data signal as long as it is in its active state, regardless of whether a further network device or entity is detected in the network or requests data.

In an alternative preferred embodiment of the data transmission network the coupling device is configured according to the embodiment described above, in which the power supply comprises an energy signal generation circuit for generating the energy signal from a portion of the signal energy of the data signals received at the second terminal from the second server. The switch device of the coupling device is then adapted to assume the second switching state when it is supplied with the energy signal by the power supply, and to assume the first switching state when it is not supplied with the energy signal by the power supply. Therefore, when the first server changes to its passive state or fails, the second server does not only need to be switched on and assume its active state, but must also be adapted such that it transmits a data signal as long as it is in its active state, regardless of whether a further network device or entity is detected in the network or requests data.

In a further alternative preferred embodiment of the data transmission network the coupling device is configured according to the embodiment described above, in which the power supply comprises a power supply terminal for connection to a power supply cable and a power supply line, lead, wire or cable interconnecting the power supply terminal and the switch device.

In this embodiment of the data transmission network the switch device of the coupling device is preferably adapted to assume the first switching state when it is supplied with the energy signal by the power supply, and to assume the second switching state when it is not supplied with the energy signal by the power supply. Further, a power supply output of the first server is connected to the power supply terminal of the coupling device by a cable, and the first server is adapted such that it provides energy at its power supply output when it is in its active state, and does not provide energy when it is in its passive state. Thereby there is no longer the necessity for the first server to transmit, after having been switched on, a data signal as long as it is in its active state, independent of whether a further network device or entity is detected in the network or requests data. However, the first server must be configured such that the energy at the power supply output is switched off when the first server changes to its passive state. The required measures, such as a suitable construction and mode of operation of the power supply of the first server, can impair the fault tolerance to a certain extent.

Similar to the alternative embodiment of the data transmission network discussed above, in which an energy signal generation circuit connected to the first terminal is provided, it is ensured that the switch device assumes and remains in the second switching state when the first server changes to its passive state or fails, because it then does not provide energy at its power supply output. Just as in the case of the alternative embodiment of the data transmission network discussed previously, this has the advantage that the switching into the second switching state for connecting the second server to the data transmission network takes place fully automatically without any further action or participation of the second server. The latter only has to change to its active state, in order to take over the tasks of the server.

However, it is also possible that the switch device of the coupling device is adapted to assume the second switching state when it is supplied with the energy signal by the power supply, and to assume the first switching state when it is not supplied with the energy signal by the power supply. Further, a power supply output of the second server is connected to the power supply terminal of the coupling device by a cable, and the second server is adapted such that it provides energy at its power supply output when it is in its active state, and does not provide energy when it is in its passive state. Different to the two cases discussed previously the switch device does not automatically assume the second switching state when the first server changes to its passive state or fails. Rather, the second server needs to actively switch the switch device by providing energy at its power supply output in a suitable manner. Further, here the second server must be constructed or configured in such a manner that the energy at the power supply output is switched off when the second server changes to its passive state.

In an embodiment several coupling devices of the construction or configuration described above are provided in the data transmission network. In other words, the coupling device mentioned until now in connection with the data transmission network is a first coupling device, and in addition also one or more further coupling devices of identical configuration are present and connected to the data transmission network. Moreover, in addition to the first and second servers the data transmission network also comprises one or more further servers, wherein for each of these further servers a further coupling device exists. The further server or the further servers are provided in addition to the second server as further redundant servers, so that even upon failure of the second server the operation of the data transmission network is ensured, by a third or, possibly, successively still further servers being able to take over the operation of the first server and the second server.

In this embodiment each further coupling device is connected with its second terminal to the third terminal of the first or another further coupling device, is connected with its first terminal to one of the further servers, and is connected by its third terminal—like the first coupling device—to the data transmission network directly or via one or more further components and, in particular, via one or more of the further coupling devices.

Thus, the first coupling device and the further coupling devices are connected in series in such a manner that the first coupling device is arranged furthest outwardly or outermost with respect to the data transmission network. Accordingly, in addition to the first coupling device there is at least also a second coupling device and, generally, n−1 further coupling devices, wherein n is a positive integer greater than 1. When numbering the coupling devices consecutively starting with the first coupling device, they are arranged in the order 1, 2, . . . , n. Moreover, in addition to the first and second servers there are also n−1 further servers, i.e. n+1 servers in total, wherein the (i+1)th server is connected to the first terminal of the ith coupling device (i is a positive integer from the interval 1 to n).

Between the first server and the third server and, for all i from 3 to n, between the ith server and the (i+1)th server there exists a respective data connection which is configured such that the first server and the ith server, respectively, is able to determine when the third server and the (i+1)th server, respectively, is in its passive state or fails or is switched off. Therefore, the data connections correspond to the data connection between the first and second servers discussed previously. Accordingly, the first server, the second server, the further servers and the switch devices of the first and the further coupling devices are adapted and connected such that for all i from 2 to n the switch device of the ith coupling device assumes the first switching state when the (i+1)th server connected to this coupling device is in its active state and operational, and that, when the (i+1)th server connected to the ith coupling device changes to its passive state or fails, the switch device assumes the second switching state and the first server and ith server, respectively, connected to the (i−1)th coupling device assumes its active state.

BRIEF DESCRIPTION OF THE DRAWINGS

In the following, the disclosure herein will be explained in more detail on the basis of preferred embodiments with reference to the figures, in which FIG. 1a schematically shows a portion of a data transmission network according to the disclosure herein pursuant to a first embodiment, in which two redundant servers are connected to a coupling device according to the disclosure herein, wherein the servers and the coupling device operate in normal operation, FIG. 1b schematically shows the portion of the data transmission network illustrated in FIG. 1a, wherein the servers and the coupling device operate in emergency operation following the failure of one of the two servers, FIG. 2 schematically shows a portion of a data transmission network according to the disclosure herein pursuant to a further embodiment, in which two redundant servers are connected to a coupling device according to the disclosure herein, wherein the servers and the coupling device operate in normal operation, and FIG. 3 schematically shows a portion of a data transmission network according to the disclosure herein pursuant to yet another embodiment, in which two redundant servers are connected to a coupling device according to the disclosure herein, wherein the servers and the coupling device operate in normal operation.

DETAILED DESCRIPTION

Figure 1A:
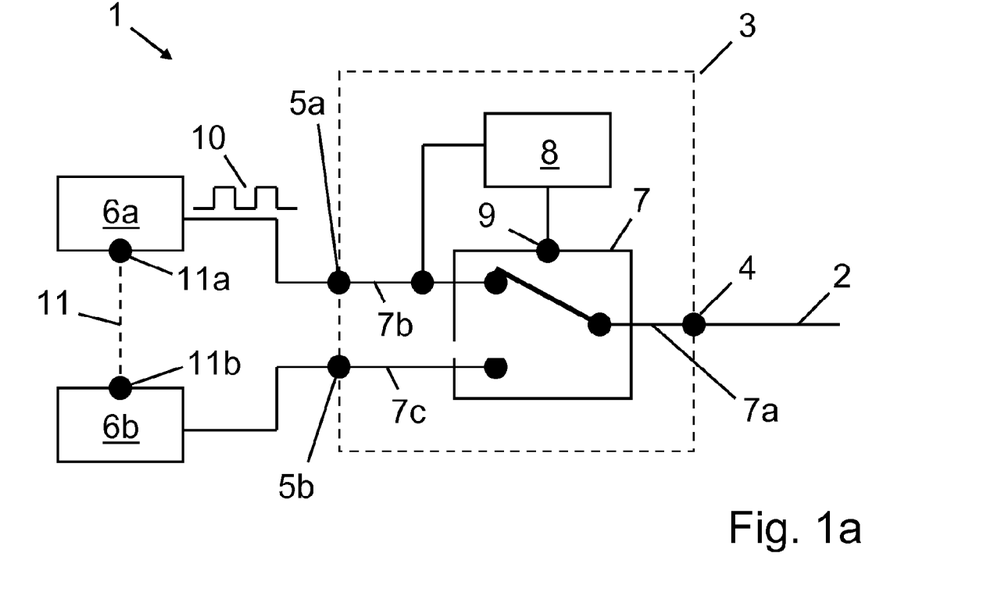
Figure 1B:
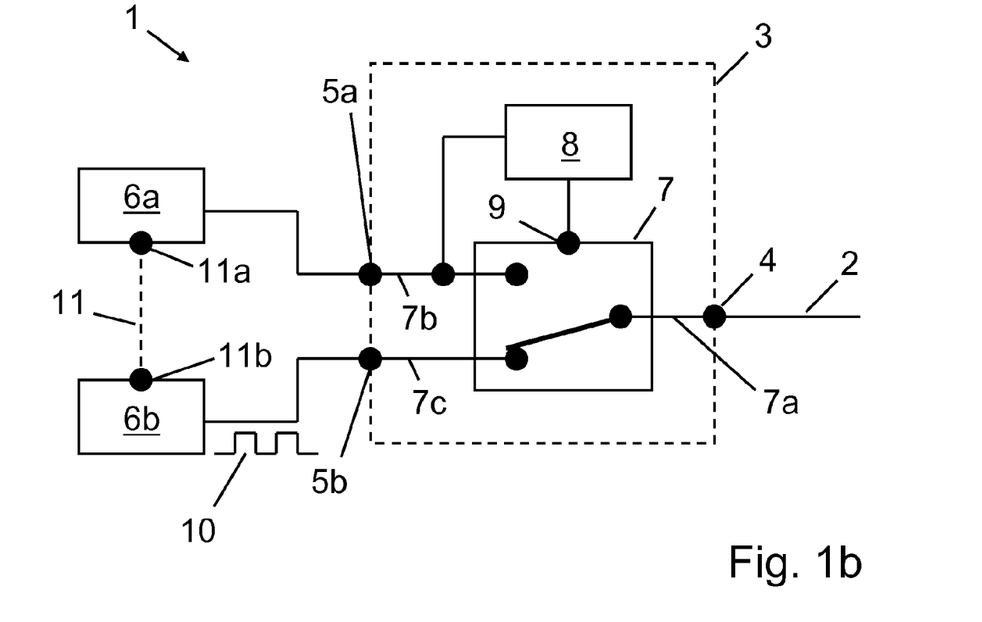

The data transmission network 1 shown in FIGS. 1a and 1b in an excerpt is constructed as a star-type Ethernet network, to a branch 2 of which a coupling device 3 is connected by a conventional Ethernet plug and socket connector 4. However, it is also possible to choose another type and/or topology for the data transmission network 1. In addition to the terminal 4 the coupling device 3 also comprises two further terminals 5a, 5b, which are also constructed as Ethernet terminals, ports or connectors and to which a first server 6a and a second server 6b, respectively, are connected or interfaced.

The two servers 6a, 6b are provided as redundant servers for the data transmission network 1. Normally, only the first server 6a operates, and the second server 6b is provided for taking over its tasks in emergencies, in particular following a failure of the first server 6a. The coupling device 3 does not only serve the mere connection, coupling or linking of the two servers 6a, 6b to the network 1, but also serves to selectively connect at each point in time always only one of the two servers 6a, 6b to the network 1 in such a manner that it is able to communicate over it. In this regard, the coupling device 3 is constructed in a particular manner such that the switching from the first server 6a to the second server 6b following a failure of the first server 6a can take place without any participation or cooperation of the first server 6a.

For this purpose, the coupling device 3 comprises a switch device 7 in the form of a change-over switch, double throw switch or two-way switch. The switch device 7 is connected to the terminal 4 and the terminals 5a, 5b, respectively, and, thus, to the network branch 2 and the two servers 6a, 6b, respectively, via three lines 7a, 7b, 7c. Moreover, the switch device 7 is connected to a circuit 8 of the coupling device 3. This circuit 8 is connected on the other hand to the line 7b between the terminal 5a and the switch device 7, so that in operation it receives a portion of the data signal energy transmitted by the first server 6a. The circuit 8 is configured such that in operation it generates from the received data signal energy a predetermined voltage or at least the predetermined voltage, which is then applied at a control input 9 of the switch device 7, and that in operation it outputs no voltage or a voltage of zero or a voltage below a predetermined limit or threshold when it receives no data signals from the first server 6a, wherein the predetermined limit or threshold is lower than the predetermined voltage.

The switch device 7 is constructed and the predetermined voltage is chosen such that the switch device 7 is in its first switching state shown in FIG. 1a, in which first switching state the first server 6a is connected to the network branch 2, as long as the predetermined voltage is present at the control input 9. Moreover, the switch device 7 is constructed and, if applicable, the predetermined limit or threshold is chosen such that the switch device 7 automatically changes into its second switching state shown in FIG. 1 b, in which second switching state the second server 6b is connected to the network branch 2, when no longer a voltage or a voltage being below the predetermined limit or threshold is present at the control input 9 of the switch device 7. In this manner it is ensured that the switch device 7 automatically changes into its second switching state when the first server 6a no longer transmits data signals 10, for example due to a failure or a switching off. For this purpose, in the simplest case the schematically illustrated switch device 7 may comprise a normally open or normally-OFF switch responsible for the first switching state and a normally closed or normally-ON switch responsible for the second switching state. These two switches each receive the control signal present at the control input 9 and output by the circuit 8 and are constructed such that they close and open, respectively, upon presence of the predetermined voltage.

In the simplest and preferred case the circuit 8 does not provide a voltage in the case of a missing data signal 10, so that it only provides the switch device 7 with energy if a data signal 10 is present. Irrespective of that it is in principle possible that instead of a voltage also another type of power supply of the switch device 7 by the circuit 8 on the basis of the received data signal energy is provided, such as, for example, a control current. Therefore, the signal provided by the circuit 8 at the control input 9 can be generally referred to as energy signal.

In normal operation, in which the first server 6a is switched on and operational, the first server 6a continuously transmits data signals 10, and this also when no data are requested by another network device or entity or when at the moment no other network device or entity is at all present in the network 1. Consequently, the switch device 7 is supplied with energy by the circuit 8 by, preferably, the predetermined voltage being present at the control input 9. This has the effect that the switch device 7 is in its first switching state shown in FIG. 1a, so that the first server 6a is communicatively connected to the network branch 2 and is able to communicate in the network 1, and that the second server 6b is communicatively disconnected or separated from the network branch 2 and is not able to communicate in the network 1.

The first server 6a and the second server 6b each have an active operating mode, in which they are ready for data communication via the network 1, and a passive operating mode, in which they are not ready for data communication via the network 1. Therefore, in normal operation the first server 6a operates in its active operating mode, while the second server 6b preferably, amongst others for reasons of energy saving, operates in its passive operating mode.

If, now, the first server 6a fails due to a defect or is switched off or, possibly, also if it changes to its passive operating mode, it no longer transmits data signals 10, and the circuit 8 preferably no longer generates a voltage or, in any case, only generates a voltage below the predetermined limit threshold. In other words, the switch device 7 is no longer or no longer sufficiently supplied with energy by the circuit 8 in order to maintain the switch device 7 in its first switching state. Therefore, the switch device 7 automatically and without participation or cooperation of the two servers 6a, 6b changes into its second switching state, which is shown in FIG. 1b and in which now instead of the first server 6a the second server 6b is communicatively connected to the network branch 2 and is able to communicate in the network 1.

If the second server 6b permanently operates in its active operating mode and transmits data also in normal operation, no further steps are required for the second server 6b to take over the function of the first server 6a and for preventing a network failure.

As has been explained above, it is, however, preferred if in normal operation the second server 6b is in its passive operating mode. Therefore, in order to be able to take over the function of the first server 6a it must in addition be switched into its active operating mode following the switching of the switch device 7 into its second switching state. Therefore, the second server 6b must then be able to determine whether the first server 6a has failed or been switched off or whether a switching of the switch device 7 into its second switching state has taken place.

In the embodiment shown a direct data connection 11 between the two servers 6a, 6b is provided for this purpose, which direct data connection 11 is constructed or configured separately from the remainder of the data transmission network 1. It can be wireless or wired and is realized by suitable separate interfaces 11a, 11b of the two servers 6a, 6b. The first server 6a is constructed or configured such that in the switched on and operational condition it permanently provides a corresponding information via the data connection 11, and the second server 6b is constructed or configured such that also in its passive operating mode it evaluates or analyzes this information and determines on its basis whether the first server 6a is still switched on and operational. If the first server 6a fails or is switched off, this information is no longer available, and the second server 6b is constructed or configured such that it then automatically changes into its active operating mode and begins with the data communication by now transmitting data 10 on its part (see FIG. 1b).

In this connection there is also the possibility that the first server 6a is constructed or configured such that it no longer provides the information or also provides a different information via the data connection 11 when it is in its passive operating mode. In this manner, a change to the second server 6b can also take place when the first server 6a is switched on and operational, but is switched from its active operating mode into its passive operating mode.

Furthermore, it is also possible that the first server 6a does not provide the information by itself via the data connection 11, but only after a request, inquiry or polling by the second server 6b. The second server 6b is then constructed or configured such that it transmits a corresponding inquiry via the data connection 11 to the first server 6a at particular fixed or variable time intervals, and the first server 6a is constructed or configured such that it responds to this inquiry— provided it is switched on and operational. The response is then evaluated and processed by the second server 6b similarly to the case described above.

Alternatively it is also conceivable that the second server 6b determines, for example by transmitting suitable measurement signals, in particular fixed or variable time intervals via the data connection 11 without further cooperation or participation of the first server 6a by a measurement whether the latter is still switched on and operational. In this case the first server 6a or the interface 11a thereof is constructed or configured such that such a measurement is possible.

Finally it is also possible to dispense with the data connection 11 and to instead construct or configure the second server 6b such that it determines by a suitable measurement in particular fixed or variable time intervals whether or not it is connected to the network branch 2. Such a measurement may be, for example, an impedance measurement or a check whether data are received via the second terminal 5b.

Due to the fact that for its switching into the second switching state the switch device 7 does not rely on control signals of the first server 6a, a high fault tolerance is provided, and due to the fact that in normal operation the second server 6b is disconnected or separated from the network branch 2 it is nevertheless possible to achieve a high data rate.

Figure 2:
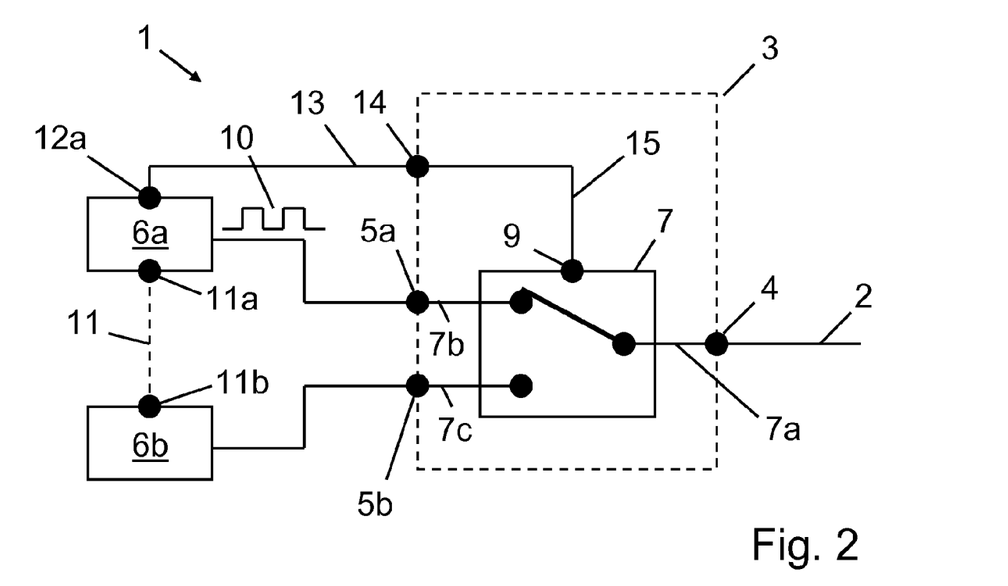

The embodiment shown in FIG. 2 differs from the embodiment shown in FIGS. 1a and 1b only in that the coupling device 3 does not comprise the circuit 8 and the control input 9 of the switch device 7 is instead connected to a separate output 12a of the first server 6a. The first server 6a is constructed or configured such that in its switched on and operational state, at least in its active operating mode, it provides at this output 12a the predetermined voltage or the energy which is provided by the circuit 8 in the embodiment of FIGS. 1a and 1b upon receipt of data signals 10 to the control input 9, and that in its switched off state or in the case of a defect it no longer provides voltage or energy at the output 12a. Furthermore, the first server 6a is preferably constructed or configured such that also in its passive operating mode it no longer provides voltage or energy at the output 12a or, at least, only a voltage or energy below the predetermined limit or threshold.

In the simplest case the voltage provided at the output 12a is derived from the power supply of the first server 6a, so that upon failure or switching off of the first server 6a no voltage is output at the output 12a any longer. The power supply must then possibly be modified such that also upon a change into the passive operating mode the voltage for the output 12a is suitably modified or no voltage is output any longer. As compared to the first embodiment this can resuit in a small reduction of the fault tolerance.

In any case, the output 12a is connected to a separate input terminal 14a of the coupling device 3 by an external cable 13a, which separate input terminal 14a is in turn connected to the control input 9 of the switch device 7 via an internal line 15. In this embodiment the terminal 14a and the line 15 correspond to the circuit 8 of the first embodiment insofar as, exactly like the circuit 8, they constitute a structure of the coupling device 7 serving the supply of a suitable control signal to the control input 9.

FIG. 2 shows the second embodiment only in normal operation with the switch device 7 in its first switching state. Apart from the differences mentioned, for the configuration, the construction, the operating principle and the operation the same applies as has been explained in detail for the first embodiment.

Figure 3:
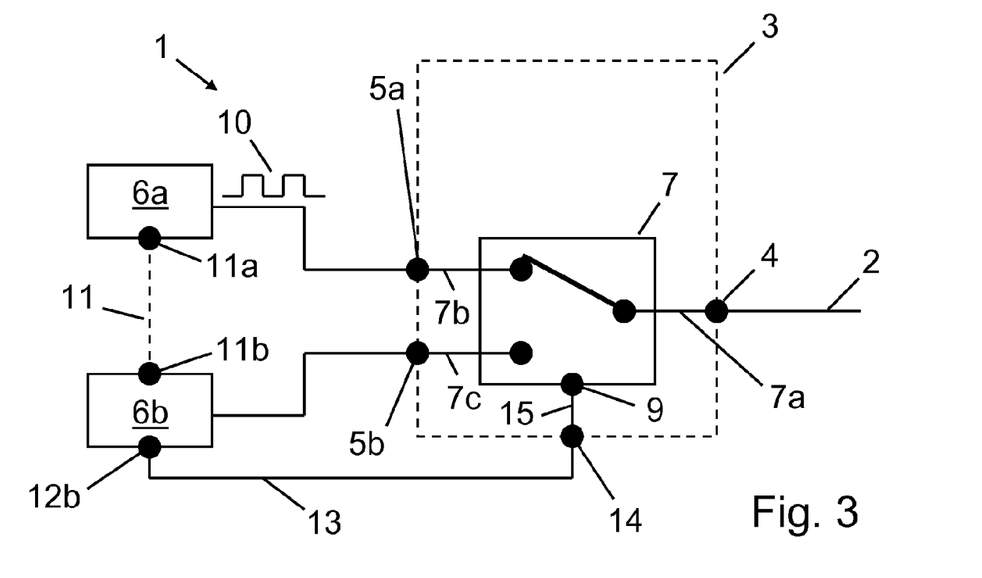

The embodiment shown in FIG. 3 is similar to the embodiment shown in FIG. 2 and differs from the latter only in that it is not the first server 6a which is provided with an output 12a connected via a cable 13a to a separate terminal 14 of the coupling device, but that the second server 6b is provided with a corresponding output 12b and connected to the terminal 14.

Different from the embodiments discussed previously, in this embodiment the switch device 7 must be constructed or configured such that it is in its first switching state shown in FIG. 3 as long as no voltage or a voltage being below the predetermined limit or threshold is present at the control input 9, and that it changes into its second switching state when the predetermined voltage is applied to the control input 9 by the second server 6b via its output 12b. Thus, in this case the second server 6b must actively switch the switch device 7 after having determined that the first server 6a has failed, has been switched off or has changed into its passive operating mode.

Apart from the differences mentioned, for the configuration, the construction, the operating principle and the operation the same applies as has been explained in detail for the first two embodiments.

The invention claimed is:

1. A coupling device for connecting one of two servers at a time to a data transmission network, wherein the coupling device comprises:
   a first terminal for connecting a first server;
   a second terminal for connecting a second server;
   a third terminal for connection to a data transmission network;
   a switch device comprising a first switching state and a second switching state, wherein
   in the first switching state the third terminal is connected to the first terminal and disconnected from the second terminal, so that a first server connected to the first terminal is able to communicate via a data transmission network connected to the third terminal and a second server connected to the second terminal cannot communicate via the data transmission network, and
   in the second switching state the third terminal is connected to the second terminal and disconnected from the first terminal, so that a second server connected to the second terminal is able to communicate via a data transmission network connected to the third terminal and a first server connected to the first terminal cannot communicate via the data transmission network; and
   a power supply electrically connected to the switch device for supplying the switch device with energy, wherein the power supply is connected or can be connected to either a first server connected to the first terminal or a second server connected to the second terminal and is adapted to then receive energy from the respective server and provide an energy signal to the switch device,
wherein the switch device is adapted to assume one of the first and second switching states when it is suplied with the energy signal by the power supply, and to assume the other of the first and second switching states when it is not supplied with the energy signal by the power supply.

2. The coupling device according to claim 1, wherein the power supply comprises an energy signal generation circuit which is connected either to the first terminal or to the second terminal in such a manner that in operation it receives the data signals, which are transmitted by a first and second server, respectively, connected to the first and second terminal, respectively, and is adapted to generate the energy signal, which is provided to the switch device, from a portion of the signal energy of the received data signals.

3. The coupling device according to claim 1, wherein the power supply comprises:
   a power supply terminal for connection to a power supply cable of either a first server connected to the first terminal or a second server connected to the second terminal; and
   a power supply line connecting the power supply terminal and the switch device to each other.

4. The coupling device according to claim 1, wherein the switch device comprises at least one normally-OFF component, such as a FET of the enrichment type, a MEMS switch, a relay or a REED relay, or at least one normally-ON component, such as a FET of the depletion type, a relay or a REED relay.

5. A data transmission network having a coupling device according to claim 1, wherein
- by its third terminal the coupling device is connected directly or via one or more further components to the data transmission network;
- a first server being able to assume an active state, in which it is able to transmit data, and a passive state, in which it cannot transmit data, is connected to the first terminal;
- a second server being able to assume an active state, in which it is able to transmit data, and a passive state, in which it cannot transmit data, is connected to the second terminal; and
- a data connection exists between the first server and the second server, which data connection is configured such that the second server is able to determine when the first server is in its passive state or fails;

and wherein
- the first server, the second server and the switch device are adapted and connected such that the switch device assumes the first switching state when the first server is in its active state and operational; and
- the switch device and the second server are adapted such that the switch device assumes the second switching state and the second server assumes its active state when the first server changes into its passive state or fails.

6. The data transmission network according to claim 5, wherein the power supply comprises an energy signal generation circuit which is connected to the first terminal in such a manner that in operation it receives the data signals, which are transmitted by the first server connected to the first terminal, and is adapted to generate the energy signal, which is provided to the switch device, from a portion of the signal energy of the received data signals, and wherein
- the switch device of the coupling device is adapted to assume the first switching state when it is suplied with the energy signal by the power supply, and to assume the second switching state when it is not supplied with the energy signal by the power supply; and
- the first server is adapted such that in its active state, following its switching on, it transmits a data signal irrespective of whether a further network device is detected in the data transmission network or requests data.

7. The data transmission network according to claim 5, wherein the power supply comprises an energy signal generation circuit which is connected to the second terminal in such a manner that in operation it receives the data signals, which are transmitted by the second server connected to the second terminal, and is adapted to generate the energy signal, which is provided to the switch device, from a portion of the signal energy of the received data signals, and wherein
- the switch device of the coupling device is adapted to assume the second switching state when it is supplied with the energy signal by the power supply, and to assume the first switching state when it is not supplied with the energy signal by the power supply; and
- the second server is adapted such that in its active state, following its switching on, it transmits a data signal irrespective of whether a further network device is detected in the data transmission network or requests data.

8. The data transmission network according to claim 5, wherein the power supply comprises
- a power supply terminal for connection to a power supply cable of either the first server connected to the first terminal or the second server connected to the second terminal; and
- a power supply line connecting the power supply terminal and the switch device to each other;

and wherein
- the switch device of the coupling device is adapted to assume the first switching state when it is suplied with the energy signal by the power supply, and to assume the second switching state when it is not supplied with the energy signal by the power supply; and
- a power supply output of the first server is connected to the power supply terminal of the coupling device by a cable, wherein the first server is adapted such that it provides energy at its power supply output when it is in its active state, and does not provide energy when it is in its passive state.

9. The data transmission network according to claim 5, wherein the power supply comprises
- a power supply terminal for connection to a power supply cable of either the first server connected to the first terminal or the second server connected to the second terminal; and
- a power supply line connecting the power supply terminal and the switch device to each other;

and wherein
- the switch device of the coupling device is adapted to assume the secand switching state when it is supplied with the energy signal by the power supply, and to assume the first switching state when it is not supplied with the energy signal by the power supply; and
- a power supply output of the second server is connected to the power supply terminal of the coupling device by a cable, wherein the second server is adapted such that it provides energy at its power supply output when it is in its active state, and does not provide energy when it is in its passive state.

10. The data transmission network according to claim 5, wherein the coupling device is a first coupling device and the data transmission network comprises at least one further coupling device according to claim 1 and at least one further server, wherein the first coupling device and the further coupling devices are connected in series, and wherein each of the further coupling devices:
- is connected with its second terminal to the third terminal of the first or another further coupling device;
- is connected with its first terminal to one of the further servers; and
- is connected by its third terminal to the data transmission network directly or via one or more further components; and wherein a data connection exists between each further server and the first server or other further server connected to the coupling device following in the direction towards the first coupling device, which data connection is configured such that the latter server is able to determine when the respective server is in its passive state or fails; and
wherein the first server, the second server, the further servers and the switch devices of the first and the further coupling devices are adapted and connected such that for each coupling device;
- the switch device assumes the first switching state when the first or further server connected to the respective coupling device is in its active state and operational; and the switch device assumes the second switching state and the first or further server connected to the coupling device following in the direction towards the first coupling device assumes its active state, when the first or further server connected to the respective coupling device changes into its passive state or fails.

* * * * *